United States Patent [19]

Mizuguchi et al.

[11] 4,116,912

[45] Sep. 26, 1978

[54] AQUEOUS RESIN DISPERSION AND THERMOSETTING PAINT COMPOSITION CONTAINING SAME

[75] Inventors: Ryuzo Mizuguchi, Tondabayashi; Atsushi Takahashi, Kyoto; Shinichi Ishikura, Takatsuki, all of Japan

[73] Assignee: Nippon Paint Co., Ltd., Osaka, Japan

[21] Appl. No.: 753,086

[22] Filed: Dec. 21, 1976

[30] Foreign Application Priority Data

Dec. 26, 1975 [JP] Japan .................................. 50-158407
Dec. 26, 1975 [JP] Japan .................................. 50-158408
Dec. 29, 1975 [JP] Japan .................................. 50-157651

[51] Int. Cl.$^2$ ....................... C08L 61/28; C08L 61/24
[52] U.S. Cl. .................. 260/29.4 UA; 260/29.6 NR; 260/851; 428/460; 428/511; 428/528; 428/530
[58] Field of Search ............. 260/29.4 UA, 851, 29.3; 526/258, 265, 307, 312, 856, 29.6 NR

[56] References Cited

U.S. PATENT DOCUMENTS

| | | | |
|---|---|---|---|
| 2,958,682 | 11/1960 | Schuller et al. | 526/312 |
| 2,977,341 | 3/1961 | Schuller | 526/265 |
| 3,671,502 | 6/1972 | Samour | 526/312 |
| 3,689,470 | 9/1972 | Shachat | 526/312 |

*Primary Examiner*—Theodore E. Pertilla
*Attorney, Agent, or Firm*—Wenderoth, Lind & Ponack

[57] ABSTRACT

A thermosetting coating composition which comprises an aqueous resin dispersion obtained by polymerization of a polymerizable monomer having an ampho-ionic structure with any other polymerizable monomer being copolymerizable therewith and an amino plast resin, and which can afford a hardened coating film having an excellent durability at a relatively low temperature within a short period of time.

6 Claims, No Drawings

AQUEOUS RESIN DISPERSION AND THERMOSETTING PAINT COMPOSITION CONTAINING SAME

The present invention relates to an aqueous resin dispersion and a thermosetting coating composition containing the same. More particularly, it relates to an aqueous resin dispersion which does not substantially include any unfavorable impurity, is stable over a wide range of pH and contains no block, and a thermosetting coating composition containing the same which can afford a hardened coating film having an excellent durability at a relatively low temperature within a short period of time.

Hitherto, a composition comprising resinous particles evenly dispersed in an aqueous medium, i.e., an aqueous resin dispersion, has been prepared by emulsion polymerization of polymerizable monomers in an aqueous medium comprising an emulsifier or a dispersing agent. However, the emulsifier or the dispersing agent is not sufficiently compatible with the resinous particles resulting from the polymerization of the polymerizable monomers and acts as an impurity in the aqueous resin dispersion, whereby various problems are caused. For instance, the coating film formed by the use of such aqueous resin dispersion is inferior in water resistance, resistance to chemicals, appearance, etc. due to the inclusion of the said impurity.

In order to avoid the use of an emulsifier or a dispersing agent causing the said problem, there has been proposed a method for production of an aqueous resin dispersion by neutralizing a polymeric material having a free carboxyl group with an amine and dispersing the neutralized product into water. However, the thus prepared aqueous resin dispersion is low in the content of non-volatile materials and inferior in the workability at a viscosity range suitable for the use as a coating composition. Further, the coating film formed from such aqueous resin dispersion is inferior in water resistance, resistance to chemicals, mechanical characteristics, etc. Furthermore, the coloration of the coating film by the amine is unavoidable. In addition, the said aqueous resin dispersion is not suitable for the use wherein pH is varied over a wide range, since it is stable only within a narrow range of pH.

As the result of the extensive study, it has now been found that the polymerization of a polymerizable monomer having an ampho-ionic structure (hereinafter referred to as "ampho-ionic monomer") with any other polymerizable monomer copolymerizable therewith (hereinafter referred to as "other monomer") by introducing them separately and simultaneously into an aqueous medium can afford an aqueous resin dispersion which does not substantially include any unfavorable impurity such as an emulsifier or a dispersing agent, is stable over a wide range of pH and contains no block. The resinous particles in the aqueous resin dispersion are each hydrophilic at the outer part and hydrophobic at the inner part. Particularly when at least one of the ampho-ionic monomer and the other monomer is introduced into the aqueous medium in the form of a mixture with any water-soluble monomer copolymerizable therewith (hereinafter referred to as "water-soluble monomer"), there is produced an aqueous resin dispersion wherein the resinous particles have a continuous variation of the composition of the monomeric units from the outer part to the inner part in each particle, which is favorable for good coalescence and can afford a coating film particularly excellent in physical properties.

In this connection, it may be noted that, when the ampho-ionic monomer and the other monomer are not separately introduced into the aqueous medium, i.e. are introduced in the form of their mixture, the polymer produced from them is deposited in the course of the polymerization to make a viscous material, and an aqueous resin dispersion having high stability and uniformity is hardly obtainable. Thus, their separate introduction to the reaction system is recommended to obtain an aqueous resin dispersion having favorable properties.

It has also been found that the combination of the aqueous resin dispersion with an aminoplast resin can provide an aqueous coating composition which is hardened at a relatively low temperature within a short period of time. These advantageous characteristics are attributed to the reaction of the ampho-ionic group in the resinous particles in the aqueous resin dispersion with the active methylol group in the aminoplast resin and the catalytic function of the said ampho-ionic group on the condensation between the active methylol group and an active hydrogen-containing compound. As well known, thermosetting coating compositions can generally form a hardened coating film with a high durability by chemical reaction affording a three-dimensional high polymer when applied to a substrate to be coated and subjected to thermal energy. In addition to these favorable properties, the aqueous coating composition comprising the aqueous resin dispersion and the aminoplast resin has the said advantageous characteristics, which may greatly contribute to economy in energy resources and, in addition, make possible their application not only to metals but also to other materials such as wood, paper and plastics.

According to the present invention, there is provided a thermosetting coating composition which comprises an aqueous resin dispersion obtained by polymerization of at least one ampho-ionic monomer with at least one other monomer being copolymerizable therewith, and at least one aminoplast resin.

The aqueous resin dispersion to be used in the invention is obtainable by polymerization of the ampho-ionic monomer with the other monomer in an aqueous medium.

As the ampho-ionic monomer, there may be exemplified the following betaine structure-containing compounds:

(i) Compounds representable by the formula:

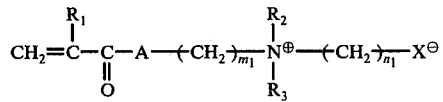

wherein $R_1$ is a hydrogen atom or a methyl group, $R_2$ and $R_3$ are each a $C_1$–$C_6$ alkyl group, A is —O— or —NH—, $m_1$ and $n_1$ are each an integer of 1 to 12 and $X^\ominus$ is $SO_3^\ominus$, $SO_4^\ominus$ or $COO^\ominus$. These compounds can be prepared by the reaction of an aminoalkyl acrylate or methacrylate with a sultone or lactone. Specific examples are 3-dimethyl(methacryloylethyl)ammonium propanesulfonate, 3-diethyl(methacryloylethyl)ammonium propanesulfonate, 3-dimethyl(acryloylethyl)ammonium propanesulfonate, 3-diethyl(acryloylethyl)ammonium propanesulfonate, 3-dimethyl(methacryloylethyl)ammonium ethanecarboxylate, 3-diethyl(methacryloylethyl)ammonium ethanecarboxylate, 3-dimethyl(acryloylethyl)ammonium ethanecarboxylate, 3-diethyl-(acryloylethyl)ammonium ethanecarboxylate; etc.

(ii) Compounds representable by either one of the formulae:

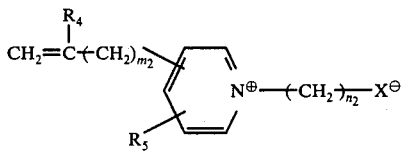

and

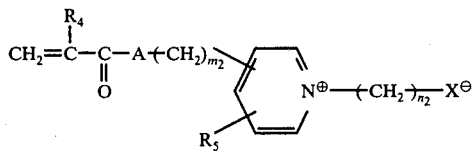

wherein $R_4$ is a hydrogen atom or a methyl group, $R_5$ is a hydrogen atom or a $C_1$-$C_3$ alkyl group, $m_2$ is an integer of 0 to 6, $n_2$ is an integer of 1 to 6 and A and $X^\ominus$ are each as defined above. These compounds can be prepared by the reaction of a vinylpyridine derivative with a sultone or lactone. Specific examples are 4-vinylpyridinium propanesulfonate, 2-vinylpyridinium propanesulfonate, 4-vinylpyridinium ethanecarboxylate, 2-vinylpyridinium ethanecarboxylate, etc.

These ampho-ionic monomers (i) and (ii) may be used solely or in combination. In practical use, they may be employed as such or in the form of an aqueous solution of suitable concentration.

The other monomer mentioned above may be a conventional one containing an ethylenic double bond. Specific examples are as follows: (a) carboxyl group-containing monomers such as acrylic acid, methacrylic acid, crotonic acid, itaconic acid, maleic acid and fumaric acid; (b) hydroxyl group-containing monomers such as 2-hydroxyethyl acrylate, 3-hydroxypropyl acrylate, 2-hydroxyethyl methacrylate, 3-hydroxypropyl methacrylate, 3-hydroxybutyl acrylate, 3-hydroxybutyl methacrylate, allyl alcohol and methallyl alcohol; (c) monomers other than (a) and (b) such as $C_1$-$C_{12}$ alkyl acrylates and methacrylates (e.g. methyl acrylate, methyl methacrylate, n-butyl acrylate); amides (e.g. acrylamide, methacrylamide); nitriles (e.g. acrylonitrile, methacrylonitrile); aromatic compounds (e.g. styrene, α-methylstyrene, vinyltoluene, t-butylstyrene), α-olefins (e.g. ethylene, propylene), vinyl compounds (e.g. vinyl acetate, vinyl propionate) and diene compounds (e.g. butadiene, isoprene), etc. These monomers (a) to (c) may be used solely or in combination.

The proportion of the ampho-ionic monomer and the other monomer may be appropriately decided depending on the thermosetting property of the composition to be prepared and the quality of the coating film. In usual, the amount of the ampho-ionic monomer is 0.1 to 50% by weight, preferably 0.3 to 30% by weight, to the total amount of the monomer components, and that of the other monomer is 50 to 99.9% by weight, preferably 70 to 99.7% by weight. When the amount of the ampho-ionic monomer is less than 0.1% by weight, the thermosetting property of the composition tends to be reduced. When the amount exceeds 50% by weight, no further improvement of the thermosetting property is expected, and the water resistance of the coating film is rather lowered. Particularly when the amount of the ampho-ionic monomer is from 0.5 to 10% by weight, a coating film having good appearance such as gloss and smoothness is obtainable.

In case of the other monomer being water-soluble, namely in case of the water-soluble monomer such as the said carboxyl group-containing monomer or the said hydroxyl group-containing monomer being used as the other monomer, its amount is desired to be 90% by weight or less to the total amount of the other monomer. With an amount higher than 90% by weight, the water resistance and the chemical resistance of the coating film tend to be deteriorated.

As the polymerization initiator, there may be employed a conventional one such as a radical initiator (e.g. potassium sulfate, ammonium persulfate, sodium persulfate, hydrogen peroxide) or a redox initiator comprising the combination of said radical initiator with sodium pyrosulfite, sodium hydrogensulfite, ferric ion or the like. These initiators may be used solely or in combination. If necessary, an organic peroxide such as benzoyl peroxide, t-butyl peroxide or cumene hydroperoxide or an azo compound such as azobisisobutyronitrile may be used together with the said polymerization initiator. The amount of the polymerization initiator is usually 0.05 to 5% by weight, preferably 0.1 to 3% by weight, to the total amount of the monomer components. A conventional chain transfer agent such as a mercaptan compound (e.g. laurylmercaptan, hexylmercaptan) may also be employed together with the polymerization initiator. The amount of the chain transfer agent is usually not more than 4% by weight based on the total weight of the monomer components.

In the polymerization reaction for obtaining the aqueous resin dispersion, the use of an emulsifying agent or a dispersing agent conventionally employed in emulsion polymerization reactions is not necessary, because the ampho-ionic monomer possesses the same functions as these agents do. The reaction is usually carried out by maintaining a mixture of the ampho-ionic monomer and the other monomer in an aqueous medium comprising water and sometimes a hydrophilic organic solvent at an appropriate temperature (usually from 4° to 100° C.) in the presence of the polymerization initiator under atmospheric or elevated pressure in an inert gas atmosphere.

As hereinbefore stated, however, the introduction of the ampho-ionic monomer and the other monomer into the reaction system in the form of their mixture unfavorably results in the deposition of viscous materials, and therefore their separate addition to an aqueous medium containing the polymerization initiator and kept at a designed reaction temperature is recommended. The addition usually takes a period of 5 to 300 minutes. Then, the resulting mixture is kept at the same temperature for a period of 5 minutes to 10 hours. It is desirable to effect the addition of each component simultaneously. Further, a portion of the polymerization initiator may be added to the reaction system in the source of the polymerization. In case of using the chain transfer agent, it is usually incorporated into the other monomer, which is to be added to the reaction system.

When the other monomer includes the water-soluble monomer, at least a part of such water-soluble monomer may be admixed with the ampho-ionic monomer prior to the addition to the reaction system. Further, a part of the amphoionic monomer may be admixed with the water-soluble monomer before the addition to the reaction system.

The thus obtained milky or creamy aqueous resin dispersion containing 5 to 70% by weight of involatile components is preferably adjusted to pH 7 or more and then admixed with the aminoplast resin.

The aminoplast resin to be used in the invention may be a conventional one such as melamine resin, urea resin or guanamine resin. These resins may be used solely or in combination. In practical use, they may be employed as such or in the form of a solution in water and/or an appropriate hydrophilic solvent (e.g. ethylene glycol monoalkyl ether, diethylene glycol monoalkyl ether). As to the amount of the aminoplast resin to be used, there is no particular limitation. In usual, the resin is used in an amount of 5 to 100 parts by weight, preferably 10 to 50 parts by weight, to 100 parts by weight of the resin content of the aqueous resin dispersion. When the amount is less than 5 parts by weight, sufficient cross-linking can not be attained, and the water resistance and the chemical resistance of the coating film become unsatisfactory. When the amount exceeds 100 parts by weight, the formed coating film becomes too fragile.

The preparation of the thermosetting coating composition is effected by admixing the aqueous resin dispersion and the aminoplast resin in an appropriate proportion, if necessary, together with conventional additives such as organic and inorganic coloring pigments, extender pigments and anti-corrosive pigments, fillers, bulking agents, viscosity increasing agents, surface active agents, pH-regulating agents, water and hydrophilic solvents, and thoroughly dispersing the resultant mixture at room temperature.

The thus prepared composition may be applied to a substrate to be coated by a conventional procedure to make a film (usually of 5 to 500μ in thickness) and then baked whereby a hardened coating film with an excellent durability is produced.

In the composition of the invention, the ampho-ion groups of the resin in the aqueous resin dispersion react effectively with the aminoplast resin to cause cross-linking and also promote the cross linking reaction between the carboxyl and hydroxyl groups and the aminoplast resin. Therefore, the hardening in the baking step can be attained at a lower temperature (e.g. 70° to 200° C.) within a shorter period of time (e.g. 30 seconds to 60 minutes) in comparison with the conditions as required for conventional compositions. Thus, the composition of the invention contributes greatly to economy of energy resources. Further, the kinds of substrates to be coated can be extended to wood, paper, plastics, etc.

The present invention will be hereinafter explained further in detail with reference to the following examples wherein parts and percents are by weight.

REFERENCE EXAMPLE 1

In a 2 liter volume separable flask equipped with a stirrer, a cooler and a thermometer, N,N-dimethylaminoethyl methacrylate (350 g) and acetone (800 g) are charged, and the contents are stirred at 30° C. A mixture of 1,3-propanesultone (272 g) and acetone (100 g) is dropwise added thereto in 30 minutes. After completion of the addition, the mixture is stirred at the same temperature for 4 hours and then allowed to stand at room temperature for one day. The precipitated white crystals are collected by filtration, washed with acetone and dried under reduced pressure to obtain 3-dimethyl(-methacryloylethyl)ammonium propanesulfonate [I] having the following structure:

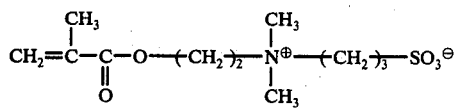

Yield, 591 g (96%). M.P. 149° C.

REFERENCE EXAMPLE 2

In the same flask as in Reference Example 1, N,N-dimethylaminoethyl methacrylate (628 g) and ethyl methyl ketone (400 g) are charged, and the contents are stirred at 0° C. A mixture of β-propiolacetone (288 g) and ethyl methyl ketone (300 g) is dropwise added thereto in 1 hour. After completion of the addition, the mixture is stirred at the same temperature for further 4 hours and then allowed to stand in a refrigerator for one day. The precipitated white crystals are collected by filtration, washed with ethyl methyl ketone and dried under reduced pressure to obtain 3-dimethyl(methacryloylethyl)ammonium ethanecarboxylate [II] having the following structure:

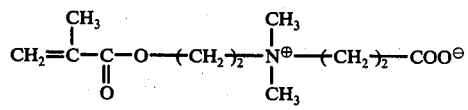

Yield, 756 g (83%). M.P. 102° C.

EXAMPLE 1

(A) Production of aqueous resin dispersion:

In a 2 liter volume reaction vessel equipped with a stirrer, a cooler, a temperature-controlling apparatus and a tube for introduction of nitrogen gas, deionized water (400 parts) is charged, and while stirring at 80° C. in nitrogen atmosphere, potassium persulfate (6 parts) and sodium hydrogensulfite (2 parts) are added thereto. The first mixed solution comprising the compound [I] (25 parts) obtained in Reference Example 1 and deionized water (75 parts) and the second mixed solution comprising methyl methacrylate (158 parts), styrene (158 parts) and n-butyl acrylate (159 parts) are dropwise added thereto separately and simultaneously in 12 minutes at the same temperature. After completion of the addition, a mixed solution comprising potassium persulfate (1.5 parts), sodium hydrogensulfite (0.5 part) and deionized water (25 parts) is added at the same temperature, and stirring is continued for further 45 minutes to obtain an aqueous resin dispersion of pH 1.3 containing 50% of involatile components and showing a viscosity of 29 cps (at 30° C.). The thus obtained aqueous resin dispersion is adjusted to pH 9 for the subsequent operation.

(B) Preparation of thermosetting coating composition

To the aqueous resin dispersion of pH 9 as prepared in (A) (80 parts), an aminoplast resin solution comprising hexamethoxymethylmelamine ("Cymel 303" manufactured by American Cyanamid Co.) (10 parts) and ethylene glycol monobutyl ether (10 parts) as the solvent is dropwise added while stirring by the aid of a mixer to make a thermosetting coating composition.

(C) Formation and estimation of coating film

The thermosetting coating composition as prepared in (B) is applied to a tin plate to make a film of about 40μ in thickness on drying and hardened at 100° C., 120° C., 140° C. or 160° C. for 20 minutes to obtain a transparent coating film. The thus formed coating film is subjected to extraction with acetone for 4 hours by the aid of a Soxhlet's extractor whereby the proportion of the residual film is confirmed to be 62% in case of hardening at 100° C., 75% in case of hardening at 120° C., 88% in case of hardening at 140° C., or 97% in case of hardening at 160° C.

EXAMPLE 2

(A) Production of aqueous resin dispersion

Using the first mixed solution comprising the compound [I] obtained in Reference Example I (50 parts) and deionized water (75 parts) and the second mixed solution comprising 2-hydroxyethyl methacrylate (75 parts), methyl methacrylate (125 parts), styrene (125 parts) and n-butyl acrylate (125 parts), the same production procedure as in Example 1 is repeated to obtain an aqueous resin dispersion of pH 1.5 containing 50% of involatile components and showing a viscosity of 40000 cps (at 30° C.). The thus obtained aqueous resin dispersion is adjusted to pH 9 for the subsequent operation.

(B) Preparation of thermosetting coating composition

To the aqueous resin dispersion of pH 9 as prepared in (A) (80 parts), the same aminoplast resin solution as in Example 1 (B) (20 parts) is dropwise added while stirring by the aid of a mixer to make a thermosetting coating composition.

(C) Formation and estimation of coating film

The thermosetting coating composition as prepared in (B) is applied to a tin plate to make a film and hardened as in Example 1 (C). By extraction with acetone by the aid of a Soxhlet's extractor, the proportion of the residual film is confirmed to be 82% in case of hardening at 100° C., 90% in case of hardening at 120° C., 95% in case of hardening at 140° C. or 97% in case of hardening at 160° C.

COMPARATIVE EXAMPLE 1

(A) Production of aqueous resin dispersion

In the same reaction vessel as in Example 1, ethylene glycol monoethyl ether (125 parts) is charged, and while stirring at 80° C. in nitrogen stream, a mixture of methyl methacrylate (133 parts), styrene (133 parts), n-butyl acrylate (134 parts), 2-hydroxyethyl methacrylate (50 parts), methacrylic acid (50 parts) and azobisisobutyronitrile (10 parts) is dropwise added thereto in 2 hours. After completion of the addition, azobisisobutyronitrile (5 parts) is added at the same temperature, and stirring is continued for further 2 hours. Then, triethylamine (41 parts) and deionized water (870 parts) are added in order to obtain an aqueous resin dispersion containing 33% of involatile components.

(B) Preparation of thermosetting coating composition

To the aqueous resin dispersion as prepared in (A) (121 parts), the same aminoplast resin solution as in Example 1 (B) (20 parts) is dropwise added while stirring by the aid of a mixer to make a thermosetting coating composition.

(C) Formation and estimation of coating film

The thermosetting composition as prepared in (B) is applied to a tin plate to make a film and hardened as in Example 1 (C). By extraction with acetone by the aid of a Soxhlet's extractor, none of the film remains in case of hardening at 100° C. or 120° C. (the film being completely dissolved and extracted because of absence of cross-linking). In case of hardening at 140° C. and 160° C., the proportions of the residual film are 60% and 90%, respectively.

EXAMPLES 3 TO 8

(A) Production of aqueous resin dispersion

Using the first mixed solutions and the second mixed solutions as shown in Table 1, the same procedure as in Example 1 is repeated to obtain aqueous resin dispersions containing 50% of involatile components (Nos. 3 to 8). These aqueous resin dispersions are adjusted to pH 9.

Table 1

| Composition | | Example No. | 3 | 4 | 5 | 6 | 7 | 8 |
|---|---|---|---|---|---|---|---|---|
| First mixed solution | Compound [I] obtained in Reference Example 1 | | 150 | — | — | 12.5 | 25 | 12.5 |
| | Compound [II] obtained in Reference Example 2 | | — | 60 | 75 | — | — | — |
| | Deionized water | | 75 | 75 | 75 | 75 | 75 | 75 |
| Second mixed solution | 2-Hydroxyethyl acrylate | | — | — | 75 | 75 | 50 | 50 |
| | Acrylic acid | | 25 | — | — | — | 21 | 10.5 |
| | Methacrylic acid | | — | — | — | 37.5 | — | — |
| | Methyl methacrylate | | 100 | 80 | 116 | 125 | 134 | 142 |
| | Styrene | | 100 | 80 | 117 | 125 | 135 | 142 |
| | n-Butyl acrylate | | 125 | 80 | 117 | 125 | 135 | 143 |
| | Laurylmercaptan | | — | — | — | — | 5 | 5 |

(B) Preparation of thermosetting coating composition and estimation of coating film 1) To the aqueous resin dispersion of pH 9 obtained in Example 3, 4, 5 or 6 (90 parts), the same aminoplast resin solution as in Example 1 (10 parts) is added to make a thermosetting coating composition. The thus obtained composition is applied to a tin plate to make a film of about 40μ in thickness on drying and heated at 120° C. for 20 minutes whereby a well cross-linked, hardened coating film is obtained.

2) To the aqueous resin dispersion of pH 9 obtained in Example 3, 4, 5 or 6 (60 parts), the same aminoplast resin solution as in Example 1 (40 parts) is added to make a thermosetting coating composition. The thus obtained composition is applied to a tin plate to make a film of about 40μ in thickness on drying and heated at 100° C. for 20 minutes whereby a well cross-linked, hardened coating film is obtained.

3) To the aqueous resin dispersion of pH 9 obtained in Example 7 or 8 (120 parts), the same aminoplast resin solution as in Example 1 (30 parts) and a white pigment (titanium oxide of rutile type; "Titon R-5N" manufactured by Sakai Chemical Industry Co., Ltd.) (50 parts) are added to make a thermosetting coating composition. The thus obtained composition is applied to a steel plate to make a film of about 40μ in thickness on drying and hardened at 140° C. for 20 minutes. The properties of the thus formed coating film are shown in Table 2.

Table 2

| Property of coating film | Example No. 7 | 8 |
| --- | --- | --- |
| Appearance of film surface | Smooth and excellent | Smooth and excellent |
| Gloss (value determined by a glossmeter of 60°) | 93 | 94 |
| Pencil hardness | H | H |
| Erichsen value (mm) | 8.5 | 9.0 |
| Impact strength (DuPont method; ½ kg, ½ inch) | 35 cm | 40 cm |
| Water resistance (40° C, 200 hrs) | No abnormality | No abnormality |
| Gasoline resistance (after immersed into commercially available gasoline for 20 minutes) | Excellent | Excellent |
| Acid resistance (after immersed | No | No |

Table 2-continued

| Property of coating film | Example No. 7 | 8 |
| --- | --- | --- |
| into 5% aqueous sulfuric acid solution for 24 hrs) | abnormality | abnormality |
| Alkali resistance (after immersed into 5% aqueous sodium hydroxide solution for 24 hrs) | No abnormality | No abnormality |

4) When the composition is applied to an ABS plastic panel of 5 mm in thickness in place of the steel plate and hardened at 80° C. for 35 minutes, an excellent coating film with gloss of 95 is obtained. This film is extremely superior in weather resistance.

EXAMPLE 9

In a 2 liter volume reaction vessel equipped with a stirrer, a cooler, a temperature-controlling apparatus and a tube for introduction of nitrogen gas, deionized water is charged, and while stirring at 80° C. in nitrogen atmosphere, potassium persulfate and sodium hydrogensulfite are added thereto. The first mixed solution comprising the compound [I] obtained in Reference Example 1 or the compound [II] obtained in Reference Example 2 and the second mixed solution comprising polymerizable monomers are dropwise added thereto separately and simultaneously in 12 minutes at the same temperature. After completion of the addition, stirring is continued at the same temperature for further 30 minutes to obtain an aqueous resin dispersion.

The proportion of the materials used for the production of the aqueous resin dispersion and the properties of the aqueous resin dispersion are shown in Table 3. All the aqueous resin dispersions as obtained are milky and contain no resinous lump. They are stable even when adjusted to pH 11 with triethylamine. When each of them is applied on an iron plate and baking is effected at 120° C. for 20 minutes, a coating film having a good appearance is obtained. Each of the aqueous resin dispersions can be admixed with an aminoplast resin to give the thermosetting coating composition of the invention.

Table 3

| | | | First mixed solution | | | | | | | Second mixed solution | | | | | Properties | | |
|---|---|---|---|---|---|---|---|---|---|---|---|---|---|---|---|---|---|
| | Initiator | | | | | | | | | | | | | | | | Non-volatile |
| Run No. | De-ionized water | Potassium persulfate | Sodium hydrogensulfite | Compound [I] | Compound [II] | De-ionized water | Methyl methacrylate | n-Butyl acrylate | Styrene | 2-Hydroxyethyl methacrylate | Methacrylic acid | Acrylic acid | Compound [II] | Lauryl mercaptan | components (%) | pH | Viscosity (cps, 30° C) |
| 1 | 400 | 4.8 | 1.6 | 200 | — | 200 | 107 | 107 | 107 | — | — | — | — | — | 40.7 | 3.1 | 22.2 |
| 2 | 400 | 6 | 2 | 50 | — | 100 | 150 | 150 | 150 | — | — | — | — | — | 49.8 | 1.1 | 281 |
| 3 | 400 | 6 | 2 | 25 | — | 100 | 158 | 158 | 158 | — | — | — | — | — | 49.7 | 1.3 | 58.4 |
| 4 | 350 | 6 | 2 | 10 | — | 150 | 163 | 163 | 163 | — | — | — | — | — | 49.1 | 1.3 | 29.4 |
| 5 | 350 | 6 | 2 | 5 | — | 150 | 165 | 165 | 165 | — | — | — | — | — | 49.5 | 1.4 | 23.1 |
| 6 | 350 | 6 | 2 | 50 | — | 150 | 133 | 133 | 133 | 50 | — | — | — | — | 49.7 | 1.5 | 2100 |
| 7 | 350 | 6 | 2 | 75 | — | 150 | 117 | 117 | 117 | 75 | — | — | — | 5 | 51.1 | 2.5 | 611 |
| 8 | 350 | 6 | 2 | 50 | — | 150 | 125 | 125 | 125 | 75 | — | — | — | — | 50.7 | 1.5 | 8160 |
| 9 | 350 | 6 | 2 | 50 | — | 150 | 133 | 133 | 133 | 50 | — | — | — | — | 50.2 | 1.9 | 1480 |
| 10 | 350 | 6 | 2 | 50 | — | 150 | 133 | 133 | 133 | 25 | — | — | — | — | 50.3 | 1.9 | 1650 |
| 11 | 350 | 6 | 2 | 25 | — | 150 | 142 | 142 | 142 | 75 | — | — | — | — | 49.4 | 1.5 | 79 |
| 12 | 350 | 6 | 2 | 125 | — | 150 | 138 | 138 | 138 | 50 | 25 | — | — | — | 50.4 | 1.9 | 180 |
| 13 | 350 | 6 | 2 | 25 | — | 150 | 133 | 133 | 133 | 75 | — | — | — | — | 50.1 | 1.9 | 83 |
| 14 | 350 | 6 | 2 | 25 | — | 150 | 135 | 135 | 135 | 50 | — | 21 | — | — | 51.4 | 2.0 | 71300 |
| 15 | 350 | 6 | 2 | — | 25 | 150 | 158 | 158 | 158 | — | 25 | — | — | 5 | 49.6 | 2.8 | 73 |
| 16 | 350 | 6 | 2 | — | 50 | 150 | 125 | 125 | 125 | 75 | — | — | — | — | 50.4 | 2.4 | 520 |
| 17 | 350 | 6 | 2 | — | 20 | 150 | 133 | 133 | 133 | 50 | 25 | — | 5 | 5 | 49.9 | 2.3 | 110 |
| 18 | 350 | 6 | 2 | 200 | — | 150 | 100 | 100 | 100 | — | — | — | — | — | 50.1 | 1.5 | 850 |

COMPARATIVE EXAMPLE 2

In the same reaction vessel as in Example 9, deionized water (450 parts) is charged, and while stirring at 80° C. in nitrogen atmosphere, potassium persulfate (6 parts) and sodium hydrogensulfite (1.6 parts) are added thereto. The first mixed solution comprising methacrylic acid (10 parts) and deionized water (25 parts) and the second mixed solution comprising methyl methacrylate (133 parts), n-butyl acrylate (133 parts), styrene (133 parts), 2-hydroxyethyl methacrylate (75 parts) and methacrylic acid (15 parts) are dropwise added thereto separately and simultaneously in 12 minutes at the same temperature. After completion of the addition, stirring is continued at the same temperature for further 1 hour to obtain an aqueous resin dispersion of pH 2.2 containing 50.2% of involatile components and showing a viscosity of 20.2 cps (at 30° C.). The thus obtained aqueous resin dispersion contains many resinous lumps and is coagulated immediately on the dropwise addition of triethylamine thereto.

COMPARATIVE EXAMPLE 3

Except for using a first mixed solution comprising methacrylic acid (35 parts) and deionized water (150 parts) and a second mixed solution comprising methyl methacrylate (138 parts), n-butyl acrylate (138 parts), styrene (138 parts) and 2-hydroxyethyl methacrylate (50 parts), the operations are repeated as in Comparative Example 2 to give an aqueous resin dispersion of pH 1.3 containing 50.6% of involatile components and showing a viscosity of 36.9 cps (at 30° C.). The thus obtained aqueous resin dispersion contains many resinous lumps and is coagulated immediately on the dropwise addition of triethylamine thereto.

COMPARATIVE EXAMPLE 4

Except for using a first mixed solution comprising methacrylic acid (5 parts) and deionized water (150 parts) and a second mixed solution comprising methyl methacrylate (138 parts), n-butyl acrylate (138 parts), styrene (138 parts), 2-hydroxyethyl methacrylate (75 parts) and methacrylic acid (7.5 parts), the operations are repeated as in Comparative Example 2 to give an aqueous resin dispersion of pH 2.4 containing 50.2% of involatile components and showing a viscosity of 45 cps (at 30° C.). The thus obtained aqueous resin dispersion contains many resinous lumps and is coagulated immediately on the dropwise addition of triethylamine thereto.

EXAMPLE 10

In a 2 liter volume reaction vessel equipped with a stirrer, a cooler, a temperature-controlling apparatus and a tube for introduction of nitrogen gas, deionized water is charged, and while stirring at 80° C. in nitrogen atmosphere, potassium persulfate and sodium hydrogensulfite are added thereto. The first mixed solution comprising the compound [I] obtained in Reference Example 1 or the compound [II] obtained in Reference Example 2 and the second mixed solution containing polymerizable monomers are dropwise added thereto separately and simultaneously in 12 minutes at the same temperature. After completion of the addition, a mixed solution comprising potassium persulfate (1.5 parts), sodium hydrogensulfite (0.5 part) and deionized water (50 parts) is added at the same temperature, and stirring is continued for further 30 minutes to obtain an aqueous resin dispersion.

The proportion of the materials used for the production of the aqueous resin dispersion and the properties of the aqueous resin dispersion are shown in Table 4. All the aqueous resin dispersions as obtained are milky and contain no resinous lump. They are stable even when adjusted to pH 11 with triethylamine. When each of them is applied on an iron plate and baking is effected at 120° C. for 20 minutes, a coating film having a good appearance is obtained. Each of the aqueous resin dispersions can be admixed with an aminoplast resin to give the thermosetting coating composition of the invention.

Table 4

| | Materials (Part(s)) | | | | | | | | | | | | | | | | | Properties | | |
|---|---|---|---|---|---|---|---|---|---|---|---|---|---|---|---|---|---|---|---|---|
| | | Initiator | | | First mixed solution | | | | | Second mixed solution | | | | | | | | Non-volatile com-ponents % | pH | Vis-cosity (cps, 30° C) |
| Run No. | De-ion-ized water | Potas-sium per-sul-fate | Sodium hydro-gensul-fite | Com-pound [I] | Com-pound [II] | Meth-acrylic acid | Acry-lic acid | 2-Hydrox-yethyl meth-acryl-ate | De-ion-ized water | Methyl meth-acryl-ate | n-Butyl acryl-ate | Styrene | 2-Hydrox-yethyl meth-acrylate | Meth-acryl-ic acid | Acrylic acid | Com-pound [II] | Lauryl mer-captan | | | |
| 1 | 300 | 4.5 | 1.5 | 25 | — | 25 | — | — | 150 | 133 | 133 | 133 | 50 | — | — | — | — | 50.2 | 1.9 | 96 |
| 2 | 350 | 6 | 2 | 25 | — | 12.5 | — | — | 150 | 133 | 133 | 133 | 50 | 12.5 | — | — | — | 49.0 | 1.9 | 224 |
| 3 | 350 | 6 | 2 | 25 | — | — | — | 25 | 150 | 133 | 133 | 133 | 25 | 25 | — | — | — | 51.0 | 1.8 | 211 |
| 4 | 350 | 6 | 1.5 | 12.5 | — | 18.5 | — | — | 150 | 125 | 125 | 125 | 75 | 18.5 | — | — | — | 50.3 | 1.8 | 152 |
| 5 | 350 | 6 | 2 | 12.5 | — | 6 | — | — | 150 | 142 | 142 | 142 | 50 | 6.5 | — | — | — | 49.8 | 1.9 | 163 |
| 6 | 350 | 6 | 2 | 25 | — | 12.5 | — | — | 150 | — | 267 | 133 | 50 | 12.5 | — | — | — | 50.1 | 1.9 | 10000 |
| 7 | 350 | 6 | 2 | 25 | — | — | 10 | — | 150 | 135 | 135 | 135 | 50 | — | 10 | — | — | 51.4 | 1.9 | 7100 |
| 8 | 350 | 6 | 2 | 12.5 | — | 6 | — | — | 150 | 142 | 142 | 142 | 50 | 6 | — | — | 5 | 50.0 | 2.1 | 206 |
| 9 | 350 | 6 | 2 | 12.5 | — | 6 | 5 | — | 150 | — | 283 | 142 | 50 | 6 | 5 | — | 5 | 49.0 | 2.2 | 90 |
| 10 | 350 | 6 | 2 | — | 6 | — | 5 | — | 150 | 143 | 143 | 142 | 50 | — | 5 | 6 | 5 | 50.2 | 1.9 | 243 |

What is claimed is:

1. A thermosetting coating composition which comprises (A) an aqueous resin dispersion prepared by polymerization of (1) a polymerizable monomer having an ampho-ionic structure of the formula

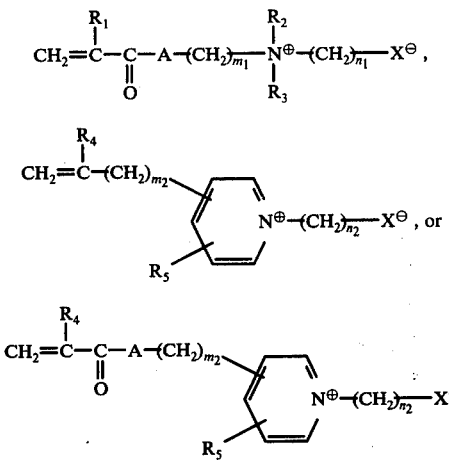

wherein $R_1$ is hydrogen or methyl, $R_2$ and $R_3$ are each $C_1$–$C_6$ alkyl, $R_4$ is hydrogen or methyl, $R_5$ is hydrogen or $C_1$–$C_3$ alkyl, A is —O— or —NH—, $m_1$ and $n_1$ are each an integer of 1 to 12, $m_2$ is an integer of 0 to 6, $n_2$ is an integer of 1 to 6 and $X^\ominus$ is $SO_3^\ominus$, $SO_4^\ominus$ or $COO^\ominus$, with (2) any other polymerizable monomer being copolymerizable therewith, in an aqueous medium, said polymerization being carried out by introducing the polymerizable monomer having an ampho-ionic structure and the other polymerizable monomer separately and simultaneously into the reaction system, and (B) an aminoplast resin, the proportion of the resin component in the aqueous resin dispersion to the aminoplast resin being 100:5 to 100:100 by weight.

2. The composition according to claim 1, wherein the proportion of the polymerizable monomer having an ampho-ionic structure to the other polymerizable monomer is 0.1:99.9 to 50:50 by weight.

3. The composition according to claim 1, wherein the proportion of the polymerizable monomer having an ampho-ionic structure to the other polymerizable monomer is 0.5:99.5 to 10:90 by weight.

4. The composition according to claim 1, wherein the polymerization is carried out in the presence of a polymerization initiator.

5. The composition according to claim 4, wherein the polymerization initiator is a radical initiator or a redox initiator.

6. The composition according to claim 1, wherein the aminoplast resin is a melamine resin, a urea resin or a guanamine resin.

* * * * *